Figure 1:
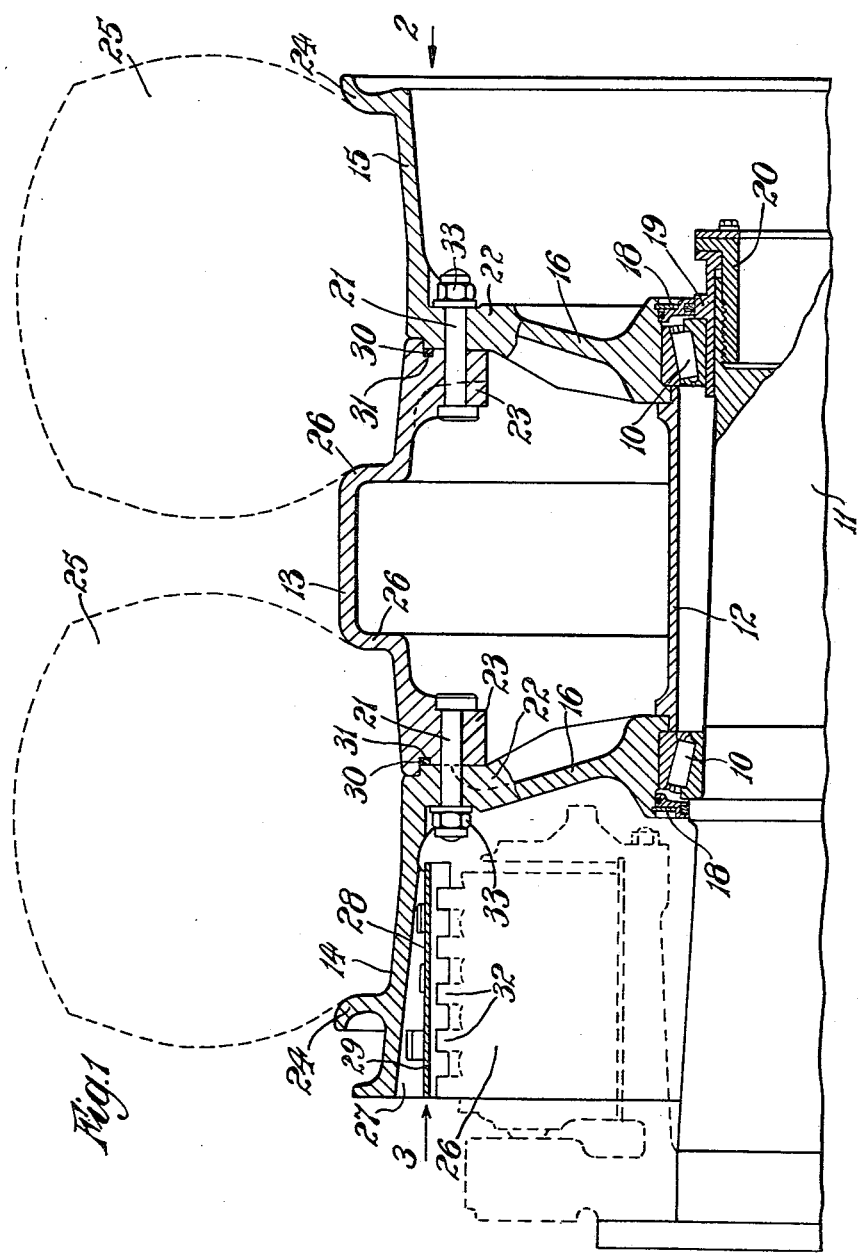

July 2, 1963   W. A. THOMPSETT   3,096,123
AIRCRAFT WHEELS

Filed Nov. 30, 1960   3 Sheets-Sheet 1

INVENTOR
William Alfred Thompsett
by Benj. T. Rauber
his attorney

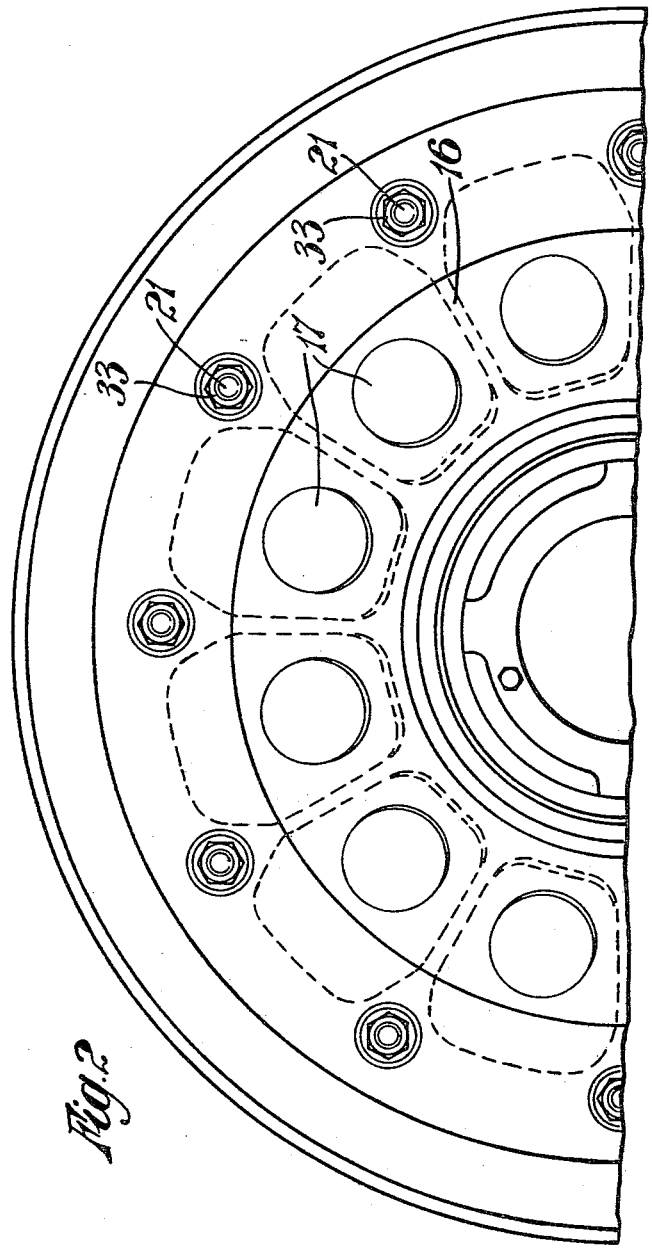

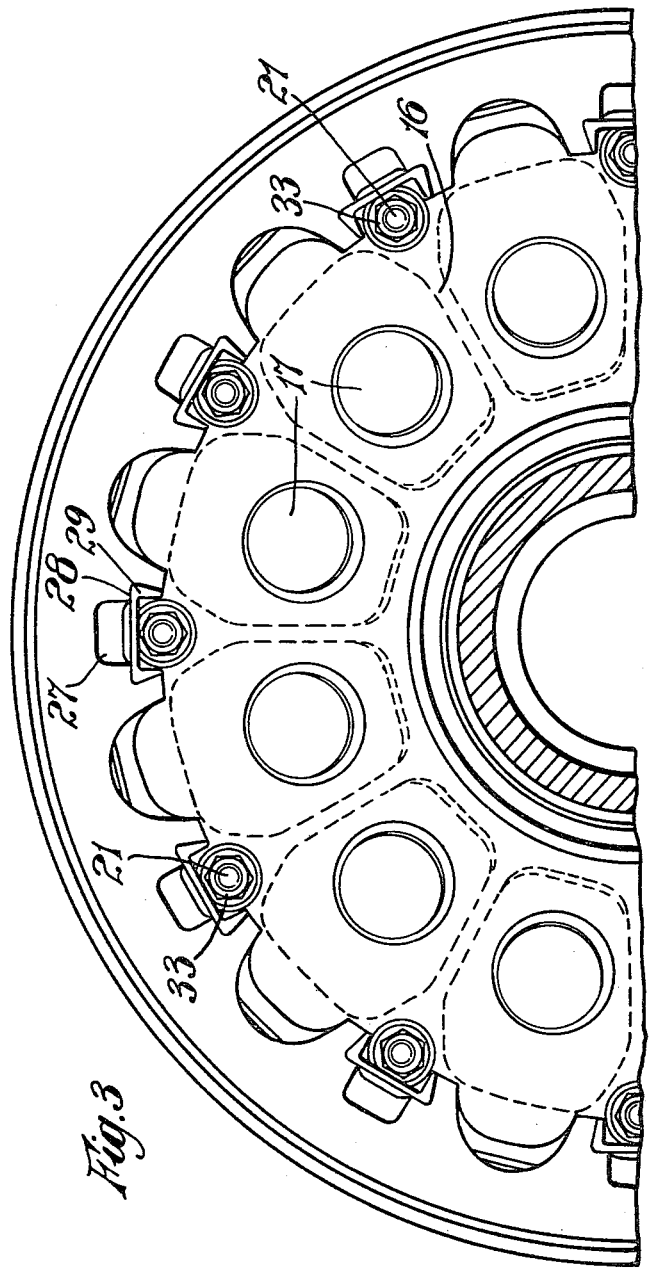

3,096,123
AIRCRAFT WHEELS
William Alfred Thompsett, Berkswell, England, assignor to Dunlop Rubber Company Limited, London, England, a British company
Filed Nov. 30, 1960, Ser. No. 72,603
Claims priority, application Great Britain Dec. 15, 1959
5 Claims. (Cl. 301—36)

This invention provides a twin wheel for an aircraft comprising a tubular hub and an annular rim constituted by a center part and two end parts detachably secured together, the center part having retaining flanges for the adjacent beads of twin tires and each outer part having a retaining flange for the other bead of one of the tires and an inwardly extending web supported on the hub.

The three parts of the rim are preferably detachably secured to one another by nut and bolt assemblies located adjacent the inner surface of the rim. Preferably also a resilient sealing ring is provided between the center part and each of said end parts, thereby preventing a leakage of air when a tubeless tire construction is used. Each sealing ring is located in an annular recess in either the center part or the end part.

Conveniently the three parts of the rim proper are forgings as this enables a lighter section to be used; moreover the porosity problem associated with cast wheels for tubeless tires is largely avoided.

One embodiment of aircraft wheel according to the invention will now be described in more detail, by way of example, with reference to the accompanying drawings, in which:

FIGURE 1 is a vertical section through the wheel and
FIGURES 2 and 3 are respectively end views looking in the directions of the arrows A and B in FIGURE 1.

The wheel is mounted on bearings 10 on a stub axle 11. It consists of a tubular hub 12 and a rim constituted by a center part 13 and end parts 14, 15, the end parts having webs 16 formed with holes 17 for lightness and cooling purposes. The webs 16 are supported on the bearings 10, outside which are oil seals 18. One of the bearings 10 is supported on a mounting sleeve 19 which is held to the axle by a retaining nut 20. The end parts 14, 15 of the rim are secured to the center part 13 by bolts 21 extending through bosses 22, 23 on the end and center parts. Sealing rings 30 are disposed in annular recesses 31 in the center part 13. The end parts 14, 15 are provided with flanges 24 for retaining the outer beads of tires 25 mounted on the wheel and flanges 26 for retaining the inner beads of the tires are provided on the center part 13.

A disk brake assembly 26 of conventional construction is provided inside the part 14 of the rim. The main part of the brake is fixed to the stub axle 11. Tapering channels 27 are cut in the rim to permit of ventilation of the brake. Wider channels 28 are cut in the rim for the reception of driving blocks 29 which engage driving dogs 32 on the periphery of the rotor of the brake assembly.

The wheel can be readily removed from the stub axle by taking off the retaining nut 20, and sliding off the mounting sleeve 19 carrying the wheel, the bearing 10 and the oil seals 18 with it. Either tire can then be removed from the wheel without disturbing the other by deflating it, removing the nuts 33 at the required side of the wheel and removing the associated side part of the wheel rim.

The construction illustrated permits a very light but robust structure. Preferably the three parts 13, 14, 15 are made from forgings which makes for a far lighter construction than with the castings customarily used. Forgings also have the advantage that there is no need to impregnate against porosity when tubeless tires are to be used. While forgings are preferred, the invention is not restricted to a wheel made up of forgings.

An additional advantage of the construction described is that if damage occurs to one of the parts during service all that is required is the replacement of the part concerned, whereas in a one-piece cast wheel a complete replacement would be necessary.

Although the construction permits the wheel to be handled as a one-piece unit, the removal of one tire only for servicing may be carried out as just described without the necessity of deflating the other tire. This lessens the danger to maintenance personnel.

Having now described my invention, what I claim is:
1. A twin wheel for an aircraft which comprises a tubular hub and an annular rim comprising a center part, two end parts detachably secured one to each end of said center part and a bearing for each end part, the center part having tire retaining flanges, one at each end, for the adjacent beads of twin tires and each end part having a retaining flange spaced from said center part for the other bead of one of the tires and a web integral with said retaining flange of each end part and extending radially inwardly from said retaining flange, to, and supported on said hub and its respective bearing.
2. A wheel according to claim 1 in which the center part and the two end parts of the rim are connected together by nut and bolt assemblies.
3. A wheel according to claim 1 comprising resilient sealing rings disposed between the center part of the rim and the end parts, said center part having annular recesses in which said sealing rings are mounted.
4. A wheel of claim 1 in which said center part consists of a single integral part.
5. A twin wheel according to claim 1 in which at least one end part has a rim extending from said web to form a recess for a brake and in which the webs of each end part have holes for the passage of air therethrough.

References Cited in the file of this patent
UNITED STATES PATENTS

| | | |
|---|---|---|
| 1,408,399 | Reddaway et al. | Feb. 28, 1922 |
| 2,918,328 | Walls | Dec. 22, 1959 |

FOREIGN PATENTS

| | | |
|---|---|---|
| 551,967 | Canada | Jan. 21, 1958 |
| 830,168 | Great Britain | Mar. 9, 1960 |